US010267953B2

United States Patent
Bolshakov et al.

(10) Patent No.: US 10,267,953 B2
(45) Date of Patent: *Apr. 23, 2019

(54) OPTICAL ARTICLE COMPRISING AN ANTIREFLECTIVE COATING WITH A VERY LOW REFLECTION IN THE VISIBLE AND ULTRAVIOLET REGIONS

(71) Applicant: ESSILOR INTERNATIONAL, Charenton-le-Pont (FR)

(72) Inventors: Ilya Bolshakov, Dallas, TX (US); Hélène Maury, Charenton-le-Pont (FR); Xingzhao Ding, Singapore (SG)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/996,742

(22) Filed: Jun. 4, 2018

(65) Prior Publication Data

US 2018/0275316 A1 Sep. 27, 2018

Related U.S. Application Data

(63) Continuation of application No. 15/308,871, filed as application No. PCT/IB2014/000948 on May 5, 2014.

(51) Int. Cl.
*G02B 1/116* (2015.01)
*G02C 7/02* (2006.01)
(Continued)

(52) U.S. Cl.
CPC .............. *G02B 1/116* (2013.01); *G02B 1/16* (2015.01); *G02C 7/022* (2013.01); *G02C 7/107* (2013.01);
(Continued)

(58) Field of Classification Search
CPC .......... G02B 1/116; G02B 1/16; G02C 7/022; G02C 7/107
(Continued)

(56) References Cited

U.S. PATENT DOCUMENTS 4,070,097 A  1/1978 Gelber
2008/0084535 A1  4/2008 De Ayguavives et al.
(Continued)

FOREIGN PATENT DOCUMENTS

EP 0614957 9/1994
JP 2011/141339 7/2011
WO WO 2012/076714 6/2012
WO WO 2014/017332 1/2014

OTHER PUBLICATIONS

International Search Report and Written Opinion issued in International Patent Application No. PCT/IB2014/000948, dated Jan. 23, 2015.

*Primary Examiner* — James Greece
(74) *Attorney, Agent, or Firm* — Norton Rose Fulbright US LLP

(57) ABSTRACT

This invention relates to an ophthalmic lens comprising a transparent substrate with a front main face and with a rear main face, at least one of the main faces being coated with a multilayered antireflective coating comprising a stack of at least one high refractive index layer (HI) having a refractive index higher than or equal to 1.55 and at least one low refractive index layer (LI) having a refractive index lower than 1.55, characterized in that:
said at least one high refractive index layer (HI) is in direct contact with said at least one low refractive index layer (LI) forming a bilayer,
said bilayer has a physical thickness lower than or equal to 60 nm,
said bilayer is, in the direction moving away from said transparent substrate, in second to last place in said multilayered antireflective coating,
(Continued)

said multilayered antireflective coating has a mean reflection factor $R_{UV}$ between 280 nm and 380 nm, lower than 5% for an angle of incidence in the range from 20° to 50°.

20 Claims, 2 Drawing Sheets

(51) Int. Cl.
*G02B 1/16* (2015.01)
*G02C 7/10* (2006.01)

(52) U.S. Cl.
CPC .... *G02B 2207/121* (2013.01); *G02C 2202/16* (2013.01)

(58) Field of Classification Search
USPC ..................................................... 351/159.01
See application file for complete search history.

(56) References Cited

U.S. PATENT DOCUMENTS

| | | | |
|---|---|---|---|
| 2012/0026456 A1 | 2/2012 | Nishimoto et al. | |
| 2014/0063608 A1 | 3/2014 | Ogo et al. | |
| 2014/0357781 A1* | 12/2014 | Yang | C08L 83/10 524/537 |
| 2015/0277145 A1* | 10/2015 | Bakaraju | A61B 3/103 351/159.43 |

* cited by examiner

|  | Lens 7 | Lens 1 | Lens 2 | Lens 3 | Lens 4 | Lens 5 | Lens 6 |
|---|---|---|---|---|---|---|---|
| Chroma C* @ 15° | 9 | 8.6 | 9 | 9 | 9 | 9 | 9 |
| Chroma C* @ 35° | 10.1 | 5.6 | 6 | 5.54 | 5.52 | 7.55 | 7.95 |
| Rv, % [380-780] @ 15° | 0.4 | 0.44 | 0.55 | 0.56 | 0.6 | 0.57 | 0.55 |
| Rv, % [380-780] @ 35° | 0.53 | 0.57 | 0.7 | 0.69 | 0.75 | 0.74 | 0.72 |
| Rv, % [380-780] @ 45° | 1.06 | 1.07 | - | - | - | - | - |
| Ruv, % [280-380] @ 15° | 6.65 | 3.71 | 3.2 | 2.23 | 2.54 | 2.42 | 2.62 |
| Ruv, % [280-380] @ 35° | 4.7 | 3.03 | 2 | 2.01 | 2.02 | 2.01 | 2.02 |
| Ruv, % [280-380] @ 45° | 4.05 | 3.29 | - | - | - | - | - |
| h @ 15° | 260 | 260 | 260 | 260 | 260 | 260 | 260 |
| Delta h (35°-15°) | 44 | 18 | -3 | 4 | -21 | 32 | 35 |
| Delta h (45°-15°) | 69 | 55 | 30 | 26 | 33 | 64 | 67 |
| Delta E76 (35°-15°) | 7.25 | 3.9 | 3.3 | 3.7 | 4.6 | 5.1 | 5.6 |
| Delta E76 (45°-15°) | 13.45 | 9.05 | 7.9 | 7.8 | 7.7 | 12.4 | 10.9 |

FIG. 2

OPTICAL ARTICLE COMPRISING AN ANTIREFLECTIVE COATING WITH A VERY LOW REFLECTION IN THE VISIBLE AND ULTRAVIOLET REGIONS

CROSS-REFERENCE TO RELATED APPLICATIONS

This application is a continuation of U.S. patent application Ser. No. 15/308,871, filed Nov. 4, 2016, which is a national phase application under 35 U.S.C. § 371 of International Application No. PCT/IB2014/000948, filed 5 May 2014. The entire contents of the aforementioned applications incorporated by reference herein without disclaimer.

FIELD OF THE INVENTION

The present invention relates to an optical article comprising an antireflective coating which strongly reduces reflection both in the UV region and in the visible region. The optical article may especially be an ophthalmic lens, especially spectacle lens.

DESCRIPTION OF RELATED ART

An antireflection coating usually consists of a multilayer comprising interferential thin layers, generally an alternation of layers based on a dielectric material of high refractive index and a dielectric material of low refractive index. When deposited on a transparent substrate, the function of such a coating is to reduce its light reflection and therefore to increase its light transmission. A substrate thus coated will therefore have its transmitted light/reflected light ratio increased, thereby improving the visibility of objects placed behind it. When it is sought to achieve a maximum antireflection effect, it is then preferable to provide both faces (front and rear faces) of the substrate with this type of coating.

This antireflective coating is usually used in the ophthalmic field. Accordingly, traditional antireflective coatings are designed and optimized to reduce reflection on the lens surface in the visible region, typically within the spectrum range of from 380 to 780 nm. In general, the mean light reflection factor in the visible region $R_v$ on the front and/or rear faces of an ophthalmic lens is between 1.5 to 2.5%.

Some of these antireflective coatings may also be designed and optimized to reduce reflection on the lens surface within the UVA band of from 315 to 400 nm and/or the UVB band of from 280 to 315 nm. These UVA and UVB bands are indeed particularly harmful to the retina.

The mean reflection in the UVA and UVB regions may thus attain high levels (up to 60%) for traditional antireflective lenses. On one hand, regarding non-solar antireflective articles which have been marketed by most of the manufacturers over the course of these recent years, the UV mean reflection does range from 10 to 25%, for an angle of incidence of from 30 to 45°. It is not problematic on the front face of the lens, since the major part of the UV radiation which comes from the front of the wearer and might attain the wearer's eye (normal incidence, 0 to 15°) generally get absorbed by the ophthalmic lens substrate. A better protection against UV radiation transmission may be obtained through solar ophthalmic lenses, which are studied and designed to reduce the visible spectrum luminosity, totally absorb UVB and totally or partially absorb UVA.

On the other hand, the UV radiation resulting from light sources located behind the wearer may reflect on the lens rear face and reach the wearer's eye if the lens is not provided with an antireflective coating which is efficient in the ultraviolet region, thus potentially affecting the wearer's health. Such phenomenon is made stronger by the trend for fashion sunglasses with high diameters which increase the risk of stray reflections getting into the eyes.

It is admitted that the light rays that may reflect onto the lens rear face and reach the wearer's eye have a narrow incidence angle range, ranging from 30 to 45° (oblique incidence).

There is currently no standard relating to the UV radiation reflection from the rear face.

Besides, optimizing the antireflective performances over the whole ultraviolet region reveals generally detrimental to the antireflective performances in the visible region. Conversely, optimizing only the antireflective performances in the visible region does not make sure that satisfactory antireflective properties can be obtained in the ultraviolet region.

There are number of patent dealing methods for making antireflective coating that would be efficient in the visible region and which is, at the same time, eventually capable of reducing the UV radiation reflection.

For instance, the application WO2012/076714 describes an ophthalmic lens with very low reflectance values in the visible region. This ophthalmic lens comprises a substrate with a front main face and with a rear main face, the rear main face being coated with a multilayered antireflective coating comprising a stack of at least one layer having a refractive index higher than 1.6 and at least one layer having a refractive index lower than 1.5. The ophthalmic lens is characterized in that:
  the mean reflection factor on said rear face in the visible region $R_m$ is lower than or equal to 1.15%,
  the mean light reflection factor on said rear face in the visible region $R_v$ is lower than or equal to 1%,
  the mean reflection factor $R_{UV}$ on said rear face between 280 nm and 380 nm, weighted by the function $W(\lambda)$ defined in the ISO 13666:1998 standard, is lower than 5%, for an angle of incidence of 30° and for an angle of incidence of 45°,
  the multilayered antireflective coating comprises a number of layers higher than or equal to 3 and lower than or equal to 7, preferably lower than or equal to 6, more preferably lower than or equal to 5,
  the multilayered antireflective coating does not comprise any electrically conductive layer with a thickness higher than or equal to 20 nm based on indium oxide, and
  the antireflective coating outer layer is a silica-based layer.

The antireflective coatings described in this application are very efficient in the visible region ($R_v$ is lower than or equal to 1%), while being at the same time capable of significantly reducing the UVA radiation reflection, especially ultraviolet A- and ultraviolet B-rays. However, it would be advisable to improve their robustness and their aesthetic appearance, especially at oblique incidence.

The term "robustness" of a lens in the present invention is defined as the ability of this lens to resist change despite the variations induced by its manufacture process. These variations depends, for instance, on the type of substrate which is used, the setting of the manufacturing machine (temperature schedule, appropriate time, setting of the electron gun . . . ) and/or its usage mode, the replacement of said manufacturing machine by another one.

Indeed, when multilayered antireflective coating is manufactured at industrial scale, some thickness variations for each layer generally occur. These variations lead to different reflection performance, and especially different perceived residual reflected color of the multilayered antireflective coating. If the perceived residual reflected color of the antireflective coating of two lenses is different, these lenses will appear different and will not be able to be associated in pair.

In addition, depending on the curvatures of the lenses and the value of incidence (angle θ), the residual reflected color of the multilayered antireflective coating of each lens seems not to be homogeneous in color on all the surface of the lens ("chameleon effect"). A different residual reflected color between the right and the left portions of a lens, such as a color gradient of different hues "h" (not the same color turning for instance from blue to red) or a color gradient of different color intensity (for example, turning from saturated color to a less saturated color, or inversely) may be viewed by an observer according to the incidence angle θ. Hence, it would be desirable to improve the esthetic appearance of such a lens by obtaining, for instance, a homogenous perceived residual reflected color of the lens surface for an observer looking at the lens wearer.

Most of antireflection coatings developed hitherto have been optimized to minimize light reflection at normal incidence, without taking into account the optical and aesthetic appearance of the multilayered antireflective coating seen at oblique incidence and/or their robustness properties.

The document JP2011-141339 describes an antireflection film intended to be placed on a substrate having a maximum reflectance of at most 0.2% at a wavelength of 400 to 700 nm. In particular, this antireflection film comprises 11 layers having successively low and high refractive index (i.e.: alternatively $SiO_2$ and $TiO_2$) and having, in the direction moving away from the substrate, the following thickness:

1) $SiO_2$ layer: 10-31 nm;
2) $TiO_2$ layer: 4-34 nm;
3) $SiO_2$ layer: 18-45 nm;
4) $TiO_2$ layer: 102-117 nm;
5) $SiO_2$ layer: 7-27 nm;
6) $TiO_2$ layer: 2-18 nm;
7) $SiO_2$ layer: 153-180 nm;
8) $TiO_2$ layer: 29-41 nm;
9) $SiO_2$ layer: 2-13 nm;
10) $TiO_2$ layer: 53-66 nm;
11) $SiO_2$ layer: 83-95 nm.

However, this document is mute of the reflectance of this antireflection film in the UV region, especially in the UVA-band (i.e.: which is ranging from 315 nm to 380).

Therefore, there is still a need to provide novel antireflective coatings having very good antireflective properties in the visible region and in the UV region, especially in the UVA, while having at the same time robustness properties and aesthetic appearance whatever the angle of incidence versus the antireflective coatings of the prior art.

SUMMARY OF THE INVENTION

An object of the invention is therefore to remedy the above drawbacks, by seeking to develop a transparent optical article, especially an ophthalmic lens, comprising a substrate in mineral or organic glass comprising at least an antireflective coating, said antireflective coating possessing very good antireflective performances in the UV region and in the visible region, while guarantying both good aesthetics whatever the angle of incidence and high robustness, and to do so without compromising the economic and/or industrial feasibility of its manufacture.

In another aspect of the invention, the antireflective coating is able to reduce the UV radiation reflection, especially ultraviolet A- and ultraviolet B-rays, as compared to a bare substrate or to a substrate comprising a traditional antireflective coating.

The invention therefore relates to an optical article, preferably an ophthalmic lens, comprising an ophthalmic lens comprising a transparent substrate with a front main face and with a rear main face, at least one of the main faces being coated with a multilayered antireflective coating comprising a stack of at least one high refractive index layer (HI) having a refractive index higher than or equal to 1.55 and at least one low refractive index layer (LI) having a refractive index lower than 1.55, characterized in that:
- said at least one high refractive index layer (HI) and said at least one low refractive index layer (LI) are adjacent, forming a bilayer,
- said bilayer has a physical thickness lower than or equal to 60 nm, preferably lower than or equal to 30 nm
- said bilayer is, in the direction moving away from said transparent substrate, in second to last place in said multilayered antireflective coating,
- said multilayered antireflective coating has a mean reflection factor $R_{UV}$ between 280 nm and 380 nm, weighted by the function $W(\lambda)$ defined in the ISO 13666:1998 standard, lower than 5% for an angle of incidence in the range from 20° to 50°.

The Applicant has discovered that the low thickness of two adjacent layers of respectively high refractive index and low refractive index combined in their position in the antireflective stack make it possible to obtain an antireflection effect over a broad reflection band (UVA, UVB and visible regions), having a neutral tint in transmission and an attractive appearance in reflection, whatever the angle of incidence at which the substrate thus coated is observed.

In addition, it has been surprisingly found that the ophthalmic lens according to the invention presents good robustness properties.

BRIEF DESCRIPTION OF THE DRAWING

The present invention will be described in more detail by referring to the appended drawing, wherein:

FIG. 2 is a table showing the optical characteristics of lenses 1 to 7 described above.

DETAILED DESCRIPTION OF THE INVENTION AND PREFERRED EMBODIMENTS

Figure 1:
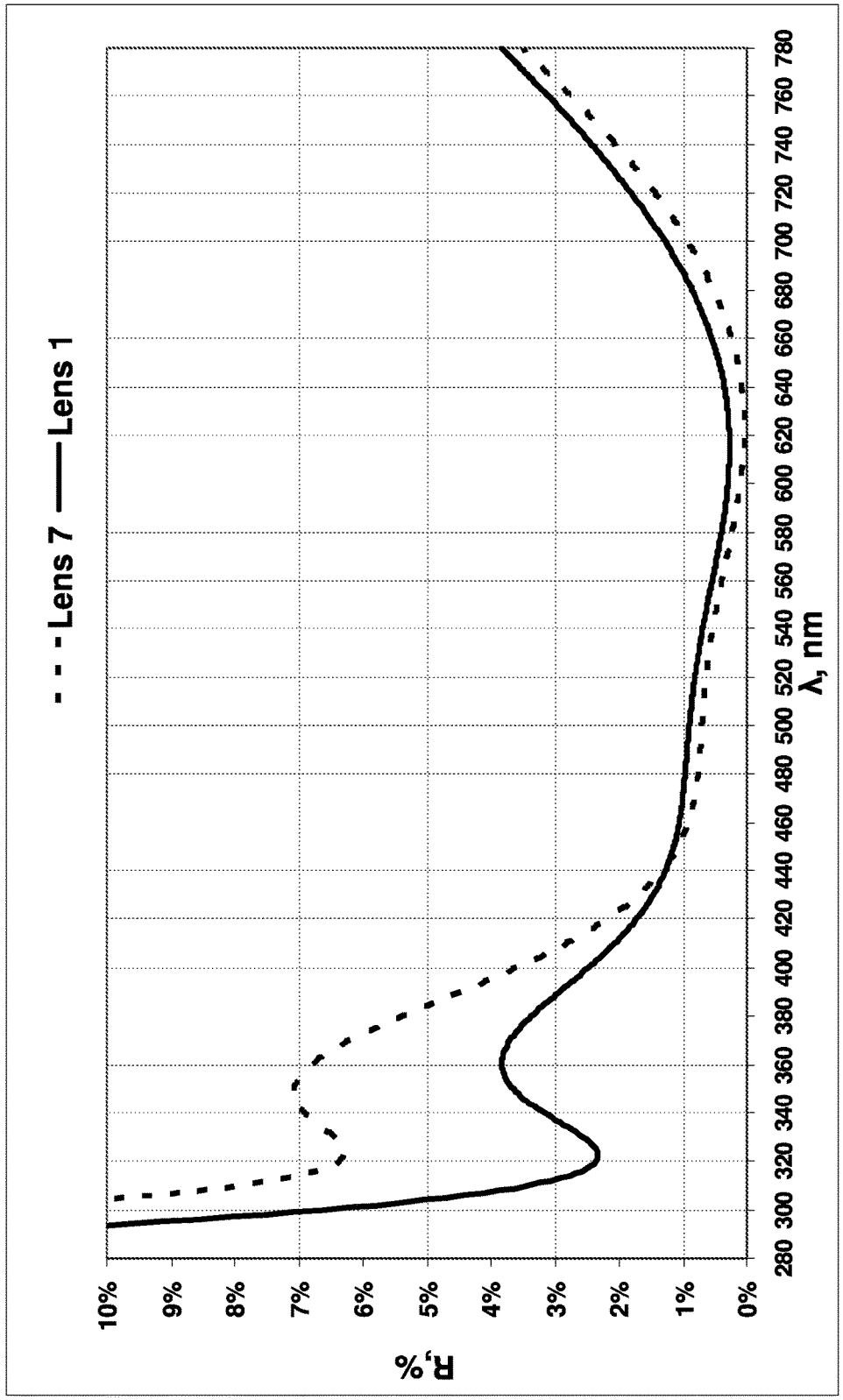
FIG. 1 shows the variation of the reflection (R, %) on the front face surface of some lenses prepared in the examples of the present application (examples 1 and 7) and for the spectral function $W(\lambda)$ at an angle of incidence θ of 15° as a function of the wavelength in the UVA (315 to 400 nm), UVB (280 to 315 nm) bands and in the visible region (380 to 780 nm. In particular, lens 1 is prepared according to the invention and lens 7 is a comparative example according to the prior art.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes"

and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

Also unless otherwise indicated, the indication of an interval of values «from X to Y» or "between X to Y", according to the present invention, means as including the values of X and Y.

In the present application, when an optical article comprises one or more coatings onto the surface thereof, the expression "to deposit a layer or a coating onto the article" is intended to mean that a layer or a coating is deposited onto the external (exposed) surface of the outer coating of the article, that is to say its coating that is the most distant from the substrate.

A coating, that is said to be "on" a substrate or deposited "onto" a substrate is defined as a coating, which (i) is positioned above the substrate, (ii) is not necessarily in contact with the substrate, that is to say one or more intermediate coatings may be arranged between the substrate and the coating in question, and (iii) does not necessarily completely cover the substrate.

In a preferred embodiment, the coating on a substrate or deposited onto a substrate is in direct contact with this substrate.

When "a layer 1 is lying under a layer 2", it is intended to mean that layer 2 is more distant from the substrate than layer 1.

As used herein, the rear (or the inner) face of the substrate is intended to mean the face which, when using the article, is the nearest from the wearer's eye. It is generally a concave face. On the contrary, the front face of the substrate, is the face which, when using the article, is the most distant from the wearer's eye. It is generally a convex face.

The optical article prepared according to the present invention is a transparent optical article, preferably a lens or lens blank, and more preferably an ophthalmic lens or lens blank. The optical article may be coated on its convex main side (front side), concave main side (back side), or both sides using the process of the invention.

Generally speaking, the antireflective coating of the optical article according to the invention, which will be called the "the antireflective coating", may be deposited onto any substrate, and preferably onto organic lens substrates, for example a thermoplastic or thermosetting plastic material.

Thermoplastic may be selected from, for instance: polyamides; polyimide; polysulfones; polycarbonates and copolymers thereof; poly(ethylene terephtalate) and polymethylmethacrylate (PMMA).

Thermoset materials may be selected from, for instance: cycloolefin copolymers such as ethylene/norbornene or ethylene/cyclopentadiene copolymers; homo- and copolymers of allyl carbonates of linear or branched aliphatic or aromatic polyols, such as homopolymers of diethylene glycol bis(allyl carbonate); homo- and copolymers of (meth)acrylic acid and esters thereof, which may be derived from bisphenol A; polymer and copolymer of thio(meth)acrylic acid and esters thereof, polymer and copolymer of allyl esters which may be derived from Bisphenol A or phtalic acids and allyl aromatics such as styrene, polymer and copolymer of urethane and thiourethane, polymer and copolymer of epoxy, and polymer and copolymer of sulphide, disulfide and episulfide, and combinations thereof.

As used herein, a (co)polymer is intended to mean a copolymer or a polymer. As used herein, a (meth)acrylate is intended to mean an acrylate or a methacrylate. As used herein, a polycarbonate (PC) is intended to mean either homopolycarbonates or copolycarbonates and block copolycarbonates.

Prior to depositing the antireflective coating onto the optionally coated substrate, for example with an abrasion-resistant layer and/or a scratch-resistant coating or with a sub-layer, the surface of said optionally coated substrate is usually submitted to a physical or chemical surface activating treatment, so as to reinforce the adhesion of the antireflective coating. Such pre-treatment is generally conducted under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma. It may also be an acid or basic treatment and/or a solvent-based treatment (water, hydrogen peroxide or any organic solvent).

As previously mentioned, the ophthalmic lens according to the invention, comprises a transparent substrate with a front main face and with a rear main face, at least one of the main faces being coated with a multilayered antireflective coating comprising a stack of at least one high refractive index layer (HI) having a refractive index higher than or equal to 1.55 and at least one low refractive index layer (LI) having a refractive index lower than 1.55, characterized in that:
said at least one high refractive index layer (HI) and said at least one low refractive index layer (LI) are adjacent, forming a bilayer,
said bilayer has a physical thickness lower than or equal to 60 nm, preferably lower than or equal to 30 nm,
said bilayer is, in the direction moving away from said transparent substrate, in second to last place in said multilayered antireflective coating,
said multilayered antireflective coating has a mean reflection factor $R_{UV}$ between 280 nm and 380 nm, weighted by the function $W(\lambda)$ defined in the ISO 13666:1998 standard, lower than 5%, preferably lower than 4% en ideally lower than 3.5% for an angle of incidence in the range from 20° to 50°.

In particular, the high refractive index layer (HI) included in said bilayer has preferably a physical thickness lower than or equal to 30 nm, preferably lower than or equal to 20 nm, more preferably lower than or equal to 15 nm, in particular lower or equal to 10 nm and ideally lower than or equal to 9 nm, provided that the total physical thickness of the bilayer is lower than or equal to 60 nm, preferably lower than or equal to 30 nm.

Also, according to the invention, the low refractive index layer (LI) included in said bilayer has preferably a physical thickness lower than or equal to 30 nm, preferably lower than or equal to 20 nm, more preferably lower than or equal to 15 nm, in particular lower or equal to 10 nm and ideally lower than or equal to 9 nm, provided that the total physical thickness of the bilayer is lower than or equal to 60 nm, preferably lower than or equal to 30 nm.

In general and as it will be explained below, the last layer, also called "outer layer" is a low refractive index layer, such as made of SiO$_2$. The term "outer layer" is understood to mean either a single layer or a superposition of layers, in which each of them satisfies the indicated refractive index and in which the sum of their geometrical thicknesses also retains the value indicated for the layer in question. For instance, the outer layer may be made of two layers made of SiO$_2$ having the same refractive index or very close or one may be made of SiO$_2$ and the other one in a mixture of silica and alumina, especially silica doped with alumina, provided that there have both low refractive index.

In addition, any layer having a thickness lower than 1 nm will not be considered when counting the number of layers in the antireflective coating.

Unless stated otherwise, all thicknesses disclosed in the present application relate to physical thicknesses.

According to the invention, the "angle of incidence (symbol θ)" is the angle formed by a ray light incident on an ophthalmic lens surface and a normal to the surface at the point of incidence. The ray light is for instance an illuminant light source, such as the standard illuminant D65 as defined in the international colorimetric CIE L*a*b*. Generally the angle of incidence changes from 0° (normal incidence) to 90° (grazing incidence). The usual range for angle of incidence is from 0° to 75°.

In the present application, the mean reflection factor between 280 nm and 380 nm, weighted by the W(λ) function defined according to the ISO 13666:1998 Standard and noted R$_{UV}$, may be defined through the following relation:

$$R_{UV} = \frac{\int_{280}^{380} W(\lambda).R(\lambda).d\lambda}{\int_{280}^{380} W(\lambda).d\lambda}$$

wherein R(λ) represents the lens spectral reflection factor at a given wavelength, and W(λ) represents a weighting function equal to the product of the solar spectrum irradiance Es(λ) and the efficiency relative spectral function S(λ).

The spectral function W(λ), enabling to calculate the ultraviolet radiation transmission factors, is defined according to the ISO 13666:1998 Standard. It makes it possible to express the ultraviolet solar radiation distribution tempered by the relative spectral efficiency of such radiation for the wearer, since it simultaneously takes both the solar spectral energy Es(λ) into account, which does globally emit less UVB-rays as compared to UVA-rays, and the spectral efficiency S(λ), UVB-rays being more harmful than UVA-rays.

According to one embodiment of the present invention, the antireflective coating deposited onto at least one of the main surfaces of the transparent substrate is such that:
  the Chroma C* is low and equal or lower than 13, preferably 10, according to the international colorimetric CIE L*a*b* for an angle of incidence θ of 15°, and/or
  the hue (h) is ranging from 250° to 330°, preferably from 260° to 320°, more preferably from 260° to 305° according to the international colorimetric CIE L*a*b* for an angle of incidence θ of less than or equal to 35°, preferably lower than or equal 30 and typically lower than or equal 15°; and/or
  the ΔE76 of the antireflective coating for angles of incidence of 15° and 45° defined by the colorimetric CIE L*a*b* is lower than or equal to 12, preferably lower or equal to 9.

Hence, the antireflective coating of the present invention shows smooth perceived residual color variation according to the angle of incidence θ.

The colorimetric coefficients of the optical article of the invention in the international colorimetric system CIE L*a*b* are calculated between 280 and 780 nm, taking the standard illuminant D65 and the observer into account (angle of 10°). It is possible to prepare antireflective coatings, without limitation as regards their hue angle. The observer is a "standard observer" as defined in the international colorimetric system CIE L*a*b*.

This international colorimetric system especially enables to determine the color variation: CIEΔE76. This parameter is defined by the following formula per "CIE 1976 L*a*b* Color space standard:

$$\Delta E^* = \sqrt{(L_1-L_2)^2 + (a_1-a_2)^2 + (b_1-b_2)^2}$$

wherein:
L$_1$, a$_1$, b$_1$ which are the coordinates in the CIE Lab color space of the first color to compare and L$_2$, a$_2$, b$_2$ are the ones of the second color to compare (this color difference is unperceivable by human eyesight when ΔE76<2).

As it will be illustrated in the examples below, the hue h of the antireflective coating is substantially constant, that is to say typically between 250° to 330° for an angle of incidence varying from 15° to 45°. Indeed, the perceived residual reflected color when the angle of incidence varying from 0 to 30° is the "same" for an observer having a normal vision. When the hue of the antireflective coating begins to vary for an angle of incidence higher than 30°, the Chroma C* is very low (lower than or equal to 8), that is to say the perceived residual reflected color is very pale such that the residual reflected color is not perceptible or hardly noticeable for an observer. Hence, the residual reflected color of the antireflective coating of the lens according to the invention is homogeneous whatever the angle of incidence. Therefore, it has good aesthetic performances (smooth color variation according to the angle of incidence).

Besides, the antireflective coating according to the invention is especially designed to possess very good antireflective performances in the visible regions and/or to minimize the reflection towards the eye of the ultraviolet radiation having an angle of incidence on the lenses especially ranging from 30 to 45°, and its preferred characteristics are described hereunder.

Preferably, the mean light reflection factor in the visible region R$_v$ of the ophthalmic lens is lower than or equal to 2.0%, preferably equal or lower than 1.5%, more preferably equal or lower than 1.0% for at least an angle of incidence lower than 35°.

Within the meaning of the invention, the "mean light reflection factor," noted R$_v$, is such as defined in the ISO 13666:1998 Standard, and measured in accordance with the ISO 8980-4, i.e. this is the weighted spectral reflection average over the whole visible spectrum between 380 and 780 nm. R$_v$ is usually measured for an angle of incidence lower than 17°, typically of 15°, but can be evaluated for any angle of incidence.

In the present application, the "mean reflection factor," noted R$_m$, is such as defined in the ISO 13666:1998 Standard, and measured in accordance with the ISO 8980-4 Standard, i.e. this is the (non weighted) spectral reflection average over the whole visible spectrum between 400 and 700 nm. $R_m$ is usually measured for an angle of incidence lower than 17°, typically of 15°, but can be evaluated for any angle of incidence.

In an embodiment, the multilayered antireflective coating has preferably a mean reflection factor in the visible region $R_m$ lower than or equal to 1.15%, preferably ≤1%, more preferably ≤0.92% for an angle of incidence lower than or equal to 35° and typically lower than or equal to 15°.

In another embodiment, the multilayered antireflective coating has a mean reflection factor $R_{UV}$ between 280 nm and 380 nm, weighted by the function $W(\lambda)$ defined in the ISO 13666:1998 standard, is lower than or equal to 6%, preferably lower than or equal to 5%, more preferably lower than or equal to 4%, for an angle of incidence in the range 15° to 45°, preferably 30° to 45°.

According to the invention, the high refractive index layer (HI) included in said bilayer is in general a conductive layer. For instance, said conductive layer comprises indium oxide, tin dioxide (also known as stannic oxide, $SnO_2$), zinc oxides or mixtures thereof. Preferred conductive layer consists in tin dioxide.

Generally, the multilayered antireflective coating comprises alternately high refractive index layers (HI) and low refractive index layers (LI) and has a number of layers lower than or equal to 10, preferably lower than or equal to 8 and in particular lower than or equal to 7.

More preferably, it comprises at least two, preferably three layers with a low refractive index (LI) and at least two, preferably three layers with a high refractive index (HI). It is here a simple stack, since the layer total number in the antireflective coating is higher than or equal to 4, and lower than or equal to 7, more preferably lower than or equal to 6, and most preferably equal to 6 layers.

In general, the outer layer of the antireflective coating which is the furthest layer from the substrate is a low refractive index layer.

Especially, the outer layer is a monolayer and has a thickness at most 100 nm, preferably between 20 to 90 nm and in particular from 45 to 80 nm.

HI layers and LI layers don't need to alternate with each other in the stack, although they also may, according to one above described embodiment of the invention. Two HI layers (or more) may be deposited onto each other, as well as two LI layers (or more) may be deposited onto each other.

In the present application, a layer of the antireflective coating is said to be a layer with a high refractive index (HI) when its refractive index is higher than or equal to 1.55, preferably higher than or equal to 1.6, even more preferably higher than or equal to 1.7, even more preferably higher than or equal to 1.8 and most preferably higher than or equal to 1.9. Said HI layer preferably has a refractive index lower than 2.1. A layer of an antireflective coating is said to be a low refractive index layer (LI) when its refractive index is lower than 1.55, preferably lower than 1.50, more preferably lower than or equal to 1.48. Said LI layer preferably has a refractive index higher than 1.1.

Unless otherwise specified, the refractive indexes referred to in the present application are expressed at 25° C. at a wavelength of 550 nm.

The HI layer is a traditional high refractive index layer, that is well known in the art. It generally comprises one or more metal oxides such as, without limitation, zirconia ($ZrO_2$), titanium dioxide ($TiO_2$), alumina ($Al_2O_3$), tantalum pentoxide ($Ta_2O_5$), neodymium oxide ($Nd_2O_5$), praseodymium oxide ($Pr_2O_3$), praseodymium titanate ($PrTiO_3$), lanthanum oxide ($La_2O_3$), niobium oxide ($Nb_2O_5$), yttrium oxide ($Y_2O_3$). Optionally, the HI layers may further contain silica or other materials with a low refractive index, provided they have a refractive index higher than or equal to 1.55 as indicated hereabove. The preferred materials include $TiO_2$, $PrTiO_3$, $ZrO_2$, $Al_2O_3$, $Y_2O_3$ and mixtures thereof.

The LI layer is also well known and may comprise, without limitation, $SiO_2$, or a mixture of silica and alumina, especially silica doped with alumina, the latter contributing to increase the antireflective coating thermal resistance. The LI layer is preferably a layer comprising at least 80% by weight of silica, more preferably at least 90% by weight of silica, relative to the layer total weight, and even more preferably consists in a silica layer. Preferably, the LI layers in the antireflective coating are not $MgF_2$ layers.

Optionally, the LI layers may further contain materials with a high refractive index, provided the refractive index of the resulting layer is lower than 1.55.

When a LI layer comprising a mixture of $SiO_2$ and $Al_2O_3$ is used, it preferably comprises from 1 to 10%, more preferably from 1 to 8% and even more preferably from 1 to 5% by weight of $Al_2O_3$ relative to the $SiO_2+Al_2O_3$ total weight in such layer.

For example, $SiO_2$ doped with 4% $Al_2O_3$ by weight, or less, or $SiO_2$ doped with 8% $Al_2O_3$ may be employed. $SiO_2/Al_2O_3$ mixtures, that are available on the market may be used, such as LIMA® marketed by the Umicore Materials AG company (refractive index n=1.48-1.50 at 550 nm), or L5® marketed by the Merck KGaA company (refractive index n=1.48 at 500 nm).

The antireflective coating outer layer is in particular a silica-based layer, comprising preferably at least 80% by weight of silica, more preferably at least 90% by weight of silica (for example a silica layer doped with alumina), relative to the layer total weight, and even more preferably consists in a silica layer.

In one embodiment of the present invention, the antireflective coating is deposited onto a sub-layer (the layer of the antireflection coating which is the nearest of the substrate, noted as UL).

As used herein, an antireflective coating sub-layer or adhesion layer is intended to mean a relatively thick coating, used in order to improve the mechanical properties such as the abrasion resistance and/or the scratch resistance of said coating and/or so as to reinforce its adhesion to the substrate or to the underlying coating.

Because of its relatively high thickness, the sub-layer does not generally take part to the antireflective optical activity, especially when it has a refractive index close to that of the underlying coating (which is generally the anti-abrasion and anti-scratch coating) or to that of the substrate, if the sub-layer is directly deposited onto the substrate.

The sub-layer should have a thickness that is sufficient for promoting the abrasion resistance of the antireflective coating, but preferably not to such an extent that a light absorption could be caused, which, depending on the sub-layer nature, could significantly reduce the relative transmission factor $\tau_v$. Its thickness is generally lower than 300 nm, more preferably lower than 200 nm, and is generally higher than 90 nm, more preferably higher than 100 nm.

The sub-layer preferably comprises a $SiO_2$-based layer, this layer comprising preferably at least 80% by weight of silica, more preferably at least 90% by weight of silica, relative to the layer total weight, and even more preferably consists in a silica layer. The thickness of such silica-based layer is generally lower than 300 nm, more preferably lower than 200 nm, and is generally higher than 90 nm, more preferably higher than 100 nm.

In another embodiment, this SiO$_2$-based layer is a silica layer doped with alumina, in amounts such as defined hereabove, preferably consists in a silica layer doped with alumina.

In a particular embodiment, the sub-layer consists in a SiO$_2$ layer.

A sub-layer of the monolayer type will be preferably used. However, the sub-layer may be laminated (multilayered), especially when the sub-layer and the underlying coating (or the substrate, if the sub-layer is deposited directly onto the substrate) have a substantially different refractive index. This applies especially when the underlying coating, which is generally an anti-abrasion and/or anti-scratch coating, or the substrate, have a high refractive index, i.a. a refractive index higher than or equal to 1.55, preferably higher than or equal to 1.57.

In this case, the sub-layer may comprise, in addition to a 90-300 nm-thick layer, called the main layer, preferably at most three additional layers, more preferably at most two additional layers, interleaved between the optionally coated substrate and such 90-300 nm-thick layer, which is generally a silica-based layer. These additional layers are preferably thin layers, which function aims at limiting the reflections at the sub-layer/underlying coating interface or sub-layer/substrate interface, as appropriate.

A multilayered sub-layer preferably comprises, in addition to the main layer, a layer with a high refractive index and with a thickness lower than or equal to 80 nm, more preferably lower than or equal to 50 nm and most preferably lower than or equal to 30 nm. Such layer with a high refractive index is directly contacting the substrate with a high refractive index or the underlying coating with a high refractive index, as appropriate. Of course, this embodiment may be used even if the substrate (or the underlying coating) has a refractive index lower than 1.55.

As an alternative, the sub-layer comprises, in addition to the main layer and to the previously mentioned layer with a high refractive index, a layer made of a SiO$_2$-based material (that is to say comprising preferably at least 80% by weight of silica) with a refractive index lower than or equal to 1.55, preferably lower than or equal to 1.52, more preferably lower than or equal to 1.50, and with a thickness lower than or equal to 80 nm, more preferably lower than or equal to 50 nm and even more preferably lower than or equal to 30 nm, onto which is deposited said layer with a high refractive index. Typically, in this instance, the sub-layer comprises, deposited in this order onto the optionally coated substrate, a 37 nm-thick SiO$_2$ layer, a 7.6 nm-thick ZrO$_2$ or Ta$_2$O$_5$ layer and thereafter the sub-layer main layer made of 152 nm SiO$_2$.

The optical article of the invention may be made antistatic, that is to say not to retain and/or develop a substantial static charge, by incorporating at least one charge dissipating conductive layer into the stack present on the surface of the article.

According to an embodiment of the invention, the antireflective coating comprises, in the direction moving away from the substrate:
 one sub-layer having a physical thickness of from 100 to 300 nm,
 one high refractive index layer (HI) having a physical thickness of from 8 to 25 nm,
 one low refractive index layer (li) having a physical thickness of from 15 to 35 nm,
 one high refractive index layer (HI) which has a physical thickness higher than or equal to 75 nm,
 the low refractive index of the bilayer having a physical thickness lower or equal to 20 nm, preferably 15 nm;
 the high refractive index of the bilayer having a physical thickness lower or equal to 20 nm, preferably 15 nm which may comprise an antistatic layer;
 the outer low refractive index layer having a physical thickness of from 55 to 95 nm.

Especially, the antireflective coating comprises, in the direction moving away from the substrate,
 one sub-layer having a physical thickness of from 120 to 180 nm,
 one high refractive index layer (HI) having a physical thickness of from 10 to 20 nm,
 one low refractive index layer (li) having a physical thickness of from 20 to 30 nm,
 one high refractive index layer (HI) having a physical thickness of from 75 to 110 nm,
 the low refractive index layer (LI) having a physical thickness of from 4 to 12 nm,
 the high refractive index layer (HI) having a physical thickness of from 3 to 12 nm, which may be an antistatic layer;
 the outer low refractive index layer having a physical thickness of from 65 to 90 nm.

When multilayered sub-layer is deposited, the antireflective coating may comprise, in the direction moving away from the substrate,
 one multilayered sub-layer comprising:
  i) one low refractive index layer (li) having a physical thickness of from 15 to 80 nm,
  ii) one high refractive index layer (HI) having a physical thickness of from 5 to 50 nm,
  iii) one main layer having a physical thickness of from 100 to 300 nm,
 one high refractive index layer (HI) having a physical thickness of from 8 to 25 nm,
 one low refractive index layer (li) having a physical thickness of from 15 to 35 nm,
 one high refractive index layer (HI) which has a physical thickness higher than or equal to 75 nm,
 the low refractive index of the bilayer having a physical thickness lower or equal to 20 nm, preferably 15 nm;
 the high refractive index of the bilayer having a physical thickness lower or equal to 20 nm, preferably 15 nm, which may comprise an antistatic layer;
 the outer low refractive index layer having a physical thickness of from 55 to 95 nm.

Especially, the antireflective coating comprising a multilayered sub-layer comprises, in the direction moving away from the substrate,
 one multilayered sub-layer comprising:
  i) one low refractive index layer (li) having a physical thickness of from 20 to 50 nm,
  ii) one high refractive index layer (HI) having a physical thickness of from 6 to 25 nm,
  iii) one main layer having a physical thickness of from 100 to 300 nm,
 one high refractive index layer (HI) having a physical thickness of from 8 to 25 nm,
 one low refractive index layer (li) having a physical thickness of from 15 to 35 nm,
 one high refractive index layer (HI) which has a physical thickness higher than or equal to 75 nm,
 the low refractive index of the bilayer having a physical thickness lower or equal to 15 nm;

the high refractive index of the bilayer having a physical thickness lower or equal to 15 nm, comprising optionally an antistatic layer;

the outer low refractive index layer having a physical thickness of from 55 to 95 nm.

Generally, the antireflective coating total thickness, without sub-layer, is lower than 1 micrometer, preferably lower than or equal to 800 nm, more preferably lower than or equal to 500 nm and even more preferably lower than or equal to 250 nm. The antireflective coating total thickness is generally higher than 100 nm, preferably higher than 150 nm.

Preferably, the antireflective coating does not comprise any layer comprising titanium oxide with a thickness higher than 90 nm, preferably higher than 70 nm. When several layers comprising titanium oxide are present in the antireflective coating, their total thickness is preferably lower than 90 nm, more preferably lower than 70 nm. Most preferably, the antireflective coating does not comprise any titanium oxide-containing layer. The titanium oxide-containing layers are indeed sensitive to photodegradation. As used herein, titanium oxide is intended to mean titanium dioxide or a substoichiometric titanium oxide (TiOx, where x<2).

The various layers of the antireflective coating and the optional sub-layer are preferably deposited by chemical vapor deposition, under vacuum, according to any of the following methods: i) by evaporation, optionally ion-beam assisted; ii) by ion-beam sputtering; iii) by cathode sputtering; iv) by plasma-assisted chemical vapor deposition. These various methods are described in the following references "Thin Film Processes" and "Thin Film Processes II," Vossen & Kern, Ed., Academic Press, 1978 and 1991, respectively.

Preferably, the deposition of each of the layers of the antireflective coating and of the optional sub-layer is conducted by evaporation under vacuum.

The present invention provides hence an antireflective coating with an improved conception, comprising a stack made of thin layers, the thicknesses and materials of which have been selected so as to obtain satisfactory antireflective performances both in the visible region and in the ultraviolet region, while having both esthetic appearance and robustness properties.

Preferably, the rear main face and the front main face of the ophthalmic lens are coated with similar or different said multilayered antireflective coating.

For instance, it is possible for the rear face of the optical article to be coated with an antireflective coating that is more efficient in the UVA and UVB bands than that of the substrate's front face (according to the characteristics described above), especially at an angle of incidence from 30 to 45°.

The anti-UV, antireflective coating may be deposited directly onto a bare substrate. In some applications, it is preferred for the main face of the substrate to be coated with one or more functional coatings prior to depositing the antireflective coating of the invention. These functional coatings traditionally used in optics may be, without limitation, an impact-resistant primer layer, an abrasion-resistant coating and/or a scratch-resistant coating, a polarizing coating, a photochromic coating or a tinted coating.

Preferably, the ophthalmic lens does not comprise any photochromic coating and/or does not comprise any photochromic substrate.

Generally, the front and/or rear main face of the substrate onto which an antireflective coating will be deposited is coated with an impact-resistant primer layer, with an anti-abrasion and/or anti-scratch coating, or with an impact-resistant primer layer coated with an anti-abrasion and/or anti-scratch coating.

The anti-UV, antireflective coating of the invention is preferably deposited onto an anti-abrasion and/or anti-scratch coating. The anti-abrasion and/or scratch-resistant coating may be any layer traditionally used as an anti-abrasion and/or anti-scratch coating in the field of ophthalmic lenses.

Prior to depositing the abrasion-resistant coating and/or the scratch-resistant coating, it is possible to apply onto the substrate a primer coating to improve the impact resistance and/or the adhesion of the subsequent layers in the final product. This coating may be any impact-resistant primer layer traditionally used for articles in a transparent polymer material, such as ophthalmic lenses.

The optical article according to the invention may also comprise coatings formed on the antireflective coating and capable of modifying the surface properties thereof, such as hydrophobic and/or oleophobic coatings (antifouling top coat). These coatings are preferably deposited onto the outer layer of the antireflective coating.

Typically, an ophthalmic lens according to the invention comprises a substrate that is successively coated on its rear face with an impact-resistant primer layer, an anti-abrasion and scratch-resistant layer, an anti-UV, antireflective coating according to the invention, and with a hydrophobic and/or oleophobic coating, or with a hydrophilic coating which provides antifog properties, or an antifog precursor coating. The ophthalmic lens according to the invention is preferably an ophthalmic lens for spectacles (spectacle lens), or a blank for ophthalmic lenses.

The front face of the substrate of the optical article may be successively coated with an impact-resistant primer layer, an abrasion-resistant layer and/or a scratch-resistant layer, an antireflective coating which may be, or not, an anti-UV, antireflective coating according to the invention, and with a hydrophobic and/or oleophobic coating.

In one embodiment, the optical article according to the invention does not absorb in the visible or not much, which means, in the context of the present application, that its transmission factor in the visible range $\tau_v$, also called relative transmission factor in the visible range, is higher than 90%, more preferably higher than 95%, even more preferably higher than 96% and most preferably higher than 97%.

The factor $\tau_v$ should be understood as defined by the international normalized definition (ISO 13666:1998 Standard) and is measured in accordance with the ISO 8980-3 Standard. It is defined in the wavelength range of from 380 to 780 nm.

Preferably, the light absorption of the article coated according to the invention is lower than or equal to 1%.

The following examples illustrate the present invention in a more detailed, but non-limiting manner.

EXAMPLES

1. General Procedures

The optical articles used in the examples comprise a lens substrate having a 65 mm diameter, a refractive index in the range of around 1.475 to 1.74, and a power of −2.00 diopters, coated with a hard coat layer of refractive index about 1.5 (such as those described in EP0614957, noted HC1.5) or about 1.6 (noted HC1.6).

The ITO (tin doped indium oxide) layer is composed of 90% of indium oxide.

The layers of the antireflective coating were deposited without heating the substrates by evaporation under vacuum (evaporation source: electron gun).

The deposition frame is a Leybold 1104 machine fitted with an electron gun (ESV14 (8 kV)) for evaporating oxides, and provided with an ion gun (Commonwealth Mark II) for the preliminary phase to prepare the surface of the substrate using argon ions (IPC).

The thickness of the layers was controlled by means of a quartz microbalance. The spectral measurements were effected on a variable incidence-spectrophotometer Perkin-Elmer Lambda 850 with an URA accessory (Universal Reflectance Accessory).

2. Test Procedure

The method for making optical articles comprises the step of introducing the substrate, a step of activating the surface of the substrate by means of an argon ion beam (anode current: 1 A, anode voltage: 100 V, neutralization current: 130 mA), turning the ion irradiation off, then forming the various layers of the antireflective coating by successive evaporations and at last a ventilation step.

3. Examples

The followings examples 1 to 6 are according to the invention and example 7 is a comparative example: lenses 1 to 6 have been prepared from respectively examples 1 to 6 and lens 7 has been prepared from example 7. The antireflective coating of lens 7 does not comprise two adjacent thin layers of one high refractive index and one low refractive index which are positioned on the top of antireflective stack coating, especially in the second to last place in the direction moving away from said transparent substrate.

Example 1

| Position | Material | Index | Thickness |
|---|---|---|---|
| 0 | HC1.5 | 1.5 | |
| 1 | SiO$_2$ (UL) | 1.4658 | 150.00 |
| 2 | ZrO$_2$ | 2.0038 | 14.83 |
| 3 | SiO$_2$ | 1.4741 | 26.99 |
| 4 | ZrO$_2$ | 2.0038 | 92.68 |
| 5 | SiO$_2$ | 1.4741 | 8.37 |
| 6 | ITO | 1.8 | 6.5 |
| 7 | SiO$_2$ | 1.4741 | 77.51 |

Example 2

| Position | Material | Index | Thickness |
|---|---|---|---|
| 0 | HC1.5 | 1.4768 | |
| 1 | UL_UV | 1.46658 | 150.00 |
| 2 | ZrO$_2$ | 2.0038 | 14.34 |
| 3 | SiO$_2$ | 1.4741 | 28.87 |
| 4 | ZrO$_2$ | 2.0038 | 101.90 |
| 5 | SiO$_2$ | 1.4741 | 13.83 |
| 6 | SnO$_2$ | 1.8432 | 6.5 |
| 7 | SiO$_2$ | 1.4741 | 66.39 |

Example 3

| Position | Material | Index | Thickness |
|---|---|---|---|
| 0 | HC1.5 | 1.4768 | |
| 1 | UL_UV | 1.46658 | 150.00 |
| 2 | ZrO$_2$ | 2.0038 | 17.28 |
| 3 | SiO$_2$ | 1.4741 | 28.34 |
| 4 | ZrO$_2$ | 2.0038 | 83.15 |
| 5 | SiO$_2$ | 1.4741 | 8.00 |
| 6 | SnO$_2$ | 1.8432 | 18.66 |
| 7 | SiO$_2$ | 1.4741 | 72.02 |

Example 4

| Position | Material | Index | Thickness |
|---|---|---|---|
| 0 | HC1.6 | 1.6 | |
| 1 | UL_UV | 1.4658 | 130.58 |
| 2 | ZrO$_2$ | 2.0038 | 10.30 |
| 3 | SiO$_2$ | 1.4741 | 29.49 |
| 4 | ZrO$_2$ | 2.0038 | 97.62 |
| 5 | SiO$_2$ | 1.4741 | 19.87 |
| 6 | SnO$_2$ | 1.8432 | 6.50 |
| 7 | SiO$_2$ | 1.4741 | 55.17 |

Example 5

| Position | Material | Index | Thickness |
|---|---|---|---|
| 0 | HC1.6 | 1.6 | |
| 1 | UL_UV | 1.4658 | 147.93 |
| 2 | ZrO$_2$ | 2.0038 | 14.47 |
| 3 | SiO$_2$ | 1.4741 | 21.08 |
| 4 | ZrO$_2$ | 2.0038 | 75.03 |
| 5 | SiO$_2$ | 1.4741 | 11.56 |
| 6 | SnO$_2$ | 1.8432 | 16.66 |
| 7 | SiO$_2$ | 1.4741 | 61.58 |

Example 6

| Position | Material | Index | Thickness |
|---|---|---|---|
| 0 | HC1.6 | 1.6 | |
| 1 | SiO$_2$ | 1.4741 | 37.13 |
| 2 | ZrO$_2$ | 2.0038 | 7.6 |
| 3 | UL_UV | 1.4658 | 152.26 |
| 4 | ZrO$_2$ | 2.0038 | 11.9 |
| 5 | SiO$_2$ | 1.4741 | 30.13 |
| 6 | ZrO$_2$ | 2.0038 | 94.53 |
| 7 | SiO$_2$ | 1.4741 | 14.61 |
| 8 | SnO$_2$ | 1.8432 | 10.05 |
| 9 | SiO$_2$ | 1.4741 | 60.24 |

Example 7: Comparative Example

| Position | Material | Index | Thickness |
|---|---|---|---|
| 0 | HC1.5 | 1.5 | |
| 1 | SiO$_2$ | 1.473 | 150.00 |

-continued

| Position | Material | Index | Thickness |
|---|---|---|---|
| 2 | ZrO$_2$ | 1.997 | 10.38 |
| 3 | SiO$_2$ | 1.473 | 26.46 |
| 4 | ZrO$_2$ | 1.997 | 97.61 |
| 5 | ITO | 2.125 | 6.50 |
| 6 | SiO$_2$ | 1.473 | 81.96 |

Results

The structural characteristics and the optical performances of the ophthalmic lenses 1 and 7 obtained respectively in the Examples 1 and 7 are detailed hereunder. The sub-layer is gray-colored. The corresponding spectral performance between 280 and 780 nm of these two lenses are illustrated on FIG. 1.

It could be observed from this FIG. 1 that the reflection in UV regions, in particular in UVA-band, is lower with the antireflection coating of the invention (lens 1) as compared with the lens comprising the comparative antireflection coating (lens 7).

Also, the table of FIG. 2 shows the optical characteristics of lens 1 to 7.

The reflection mean factor values are those of the front face. The factors R$_v$, R$_m$, and R$_{uv}$ are provided for an angle of incidence θ of 15°, 35° or 45° and the colorimetric coefficients of the optical article of the invention in the international colorimetric system CIE L*a*b* are calculated between 380 and 780 nm, taking the standard illuminant D 65 at various angle of incidence θ and the observer into account (angle of 10°) (for all the examples).

It could be observed from this figure that the lens 1 according to the invention obtained in Example 1 possesses very good antireflective properties in the visible region (R$_v$≤0.44% for an angle of incidence of 15°), with no detrimental on the antireflective performances in the ultraviolet region, wherein R$_{uv}$≤3.71% for an angle of incidence of 15°. In addition, Colour variation on incident angle between 45° and 15° of incident angle, as measured by ΔE76 is 9 for Lens 1, compared to 13 for lens 7. The perceived reflected colour will appear more homogeneous for lens 1.

Indeed, as it is also illustrated on FIG. 1, lens 1 obtained from example 1 reduces both UVA and UVB radiation reflections and is as the same time is very efficient to reduce the reflection in the visible region. Lens 7 obtained from example 7 is less efficient than lens 1 to reduce the UVA radiation reflection (maximum Ruva value around 6.65%).

Lenses 2 to 6 show performances similar to lens 1: antireflective properties in the visible region is good (R$_v$≤0.60% for an angle of incidence of 15°) with no detrimental on the antireflective performances in the ultraviolet region (R$_{uv}$≤3.5% for an angle of incidence of 15°). Colour variation on incident angle between 45° and 15° of incident angle, as measured by ΔE76 is lower than 13, and lower than 9 for lenses 3, 4 and 5.

In addition, adding one thin low index layer between layer #4 and #5 (which have both high index) greatly improves design performance in UV, while keeping good performance in the visible region along with good angular sensitivity and good manufacturability.

Furthermore, the lens coating enable to obtain good antireflection effect over a broad reflection band, especially in UVA and visible regions, having a neutral tint in transmission and an attractive appearance in reflection, whatever the angle of incidence at which the substrate thus coated is observed.

The invention claimed is:

1. An ophthalmic lens comprising a transparent substrate with a front main face and with a rear main face, at least one of the main faces being coated with a multilayered antireflective coating comprising a stack of at least one high refractive index layer (HI) having a refractive index higher than or equal to 1.55 and at least one low refractive index layer (LI) having a refractive index lower than 1.55, wherein:
said at least one high refractive index layer (HI) and said at least one low refractive index layer (LI) are adjacent, forming a bilayer;
said bilayer has a physical thickness lower than or equal to 60 nm;
said bilayer is, in the direction moving away from said transparent substrate, in second to last place in said multilayered antireflective coating; and
wherein the antireflective coating has a ΔE76 for angles of incidence of 15° and 45° defined by the colorimetric CIE L*a*b* which is lower than or equal to 12".

2. The ophthalmic lens of claim 1, wherein said multilayered antireflective coating has a mean reflection factor RUV between 280 nm and 380 nm, lower than 5% for an angle of incidence in the range from 20° to 50°.

3. The ophthalmic lens of claim 1, wherein said bilayer has a physical thickness lower than or equal to 30 nm.

4. The ophthalmic lens of claim 3, wherein the high refractive index layer (HI) included in said bilayer has a physical thickness lower than or equal to 15 nm.

5. The ophthalmic lens of claim 1, wherein the low refractive index layer (LI) included in said bilayer has a physical thickness lower than or equal to 30 nm, provided that the total physical thickness of the bilayer is lower than or equal to 60 nm.

6. The ophthalmic lens of claim 5, wherein the low refractive index layer (LI) included in said bilayer has a physical thickness lower than or equal to 15 nm provided that the total physical thickness of the bilayer is lower than or equal to 60 nm.

7. The ophthalmic lens of claim 1, wherein the high refractive index layer (HI) included in said bilayer is a conductive layer.

8. The ophthalmic lens of claim 7, wherein said conductive layer comprises indium oxide, tin dioxide, zinc oxides or mixtures thereof.

9. The ophthalmic lens of claim 7, wherein said conductive layer comprises Indium Tin Oxide In$_2$O$_3$/SnO.

10. The ophthalmic lens of claim 1, wherein the multilayered antireflective coating comprises alternately high refractive index layers (HI) and low refractive index layers (LI) and has a number of layers lower than or equal to 10.

11. The ophthalmic lens of claim 10, wherein the multilayered antireflective coating has a number of layers lower than or equal to 7.

12. The ophthalmic lens of claim 1, wherein the outer layer which is the furthest layer from the substrate is a low refractive index layer.

13. The ophthalmic lens of claim 12, wherein the outer layer is a monolayer and has a thickness at most 100 nm.

14. The ophthalmic lens of claim 12, wherein the outer layer is a monolayer and has a thickness between 20 to 90 nm.

15. The ophthalmic lens of claim 10, wherein the antireflective coating comprises, in the direction moving away from the substrate:
one sub-layer having a physical thickness of from 100 to 300 nm;

one high refractive index layer (HI) having a physical thickness of from 8 to 25 nm;
one low refractive index layer (li) having a physical thickness of from 15 to 35 nm;
one high refractive index layer (HI) which has a physical thickness higher than or equal to 75 nm;
the low refractive index of the bilayer having a physical thickness lower or equal to 20 nm;
the high refractive index of the bilayer having a physical thickness lower or equal to 20 nm; and
the outer low refractive index layer having a physical thickness of from 55 to 95 nm.

16. The ophthalmic lens of claim 15, wherein the antireflective coating comprises, in the direction moving away from the substrate:
one sub-layer having a physical thickness of from 120 to 180 nm;
one high refractive index layer (HI) having a physical thickness of from 10 to 20 nm;
one low refractive index layer (li) having a physical thickness of from 20 to 30 nm;
one high refractive index layer (HI) having a physical thickness of from 75 to 110 nm;
the low refractive index layer (LI) having a physical thickness of from 4 to 12 nm;
the high refractive index layer (HI) having a physical thickness of from 3 to 12 nm; and
the outer low refractive index layer having a physical thickness of from 65 to 90 nm.

17. The ophthalmic lens of claim 10, wherein the antireflective coating comprises, in the direction moving away from the substrate:
one multilayered sub-layer comprising:
i) one low refractive index layer (LI) having a physical thickness of from 15 to 80 nm;
ii) one high refractive index layer (HI) having a physical thickness of from 5 to 50 nm; and
iii) one main layer having a physical thickness of from 100 to 300 nm;
one high refractive index layer (HI) having a physical thickness of from 8 to 25 nm;
one low refractive index layer (li) having a physical thickness of from 15 to 35 nm;
one high refractive index layer (HI) which has a physical thickness higher than or equal to 75 nm;
the low refractive index of the bilayer having a physical thickness lower or equal to 20 nm;
the high refractive index of the bilayer having a physical thickness lower or equal to 20 nm, comprising optionally an antistatic layer; and
the outer low refractive index layer having a physical thickness of from 55 to 95 nm.

18. The ophthalmic lens of claim 17, wherein the antireflective coating comprises, in the direction moving away from the substrate:
one multilayered sub-layer comprising:
i) one low refractive index layer (li) having a physical thickness of from 20 to 50 nm;
ii) one high refractive index layer (HI) having a physical thickness of from 6 to 25 nm;
iii) one main layer having a physical thickness of from 100 to 300 nm;
one high refractive index layer (HI) having a physical thickness of from 8 to 25 nm;
one low refractive index layer (li) having a physical thickness of from 15 to 35 nm;
one high refractive index layer (HI) which has a physical thickness higher than or equal to 75 nm;
the low refractive index of the bilayer having a physical thickness lower or equal to 15 nm;
the high refractive index of the bilayer having a physical thickness lower or equal to 15 nm, which may comprise an antistatic layer; and
the outer low refractive index layer having a physical thickness of from 55 to 95 nm.

19. The ophthalmic lens of claim 1, wherein the rear main face and the front main face of the ophthalmic lens are coated with similar or different said multilayered antireflective coating.

20. The ophthalmic lens of claim 1, wherein the antireflective coating has a ΔE76 for angles of incidence of 15° and 45° defined by the colorimetric CIE L*a*b* which is lower than or equal to 12.

* * * * *